UNITED STATES PATENT OFFICE.

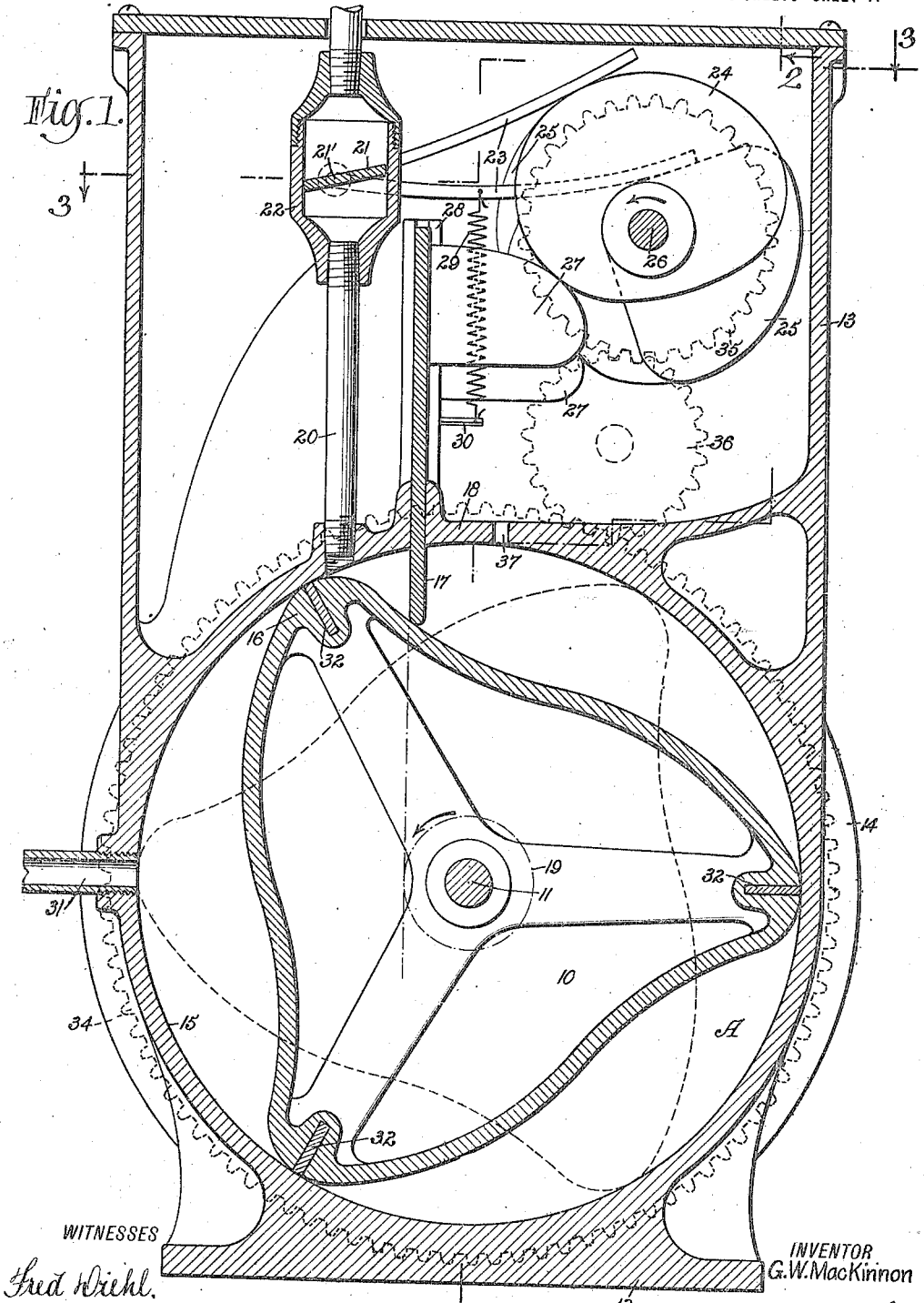

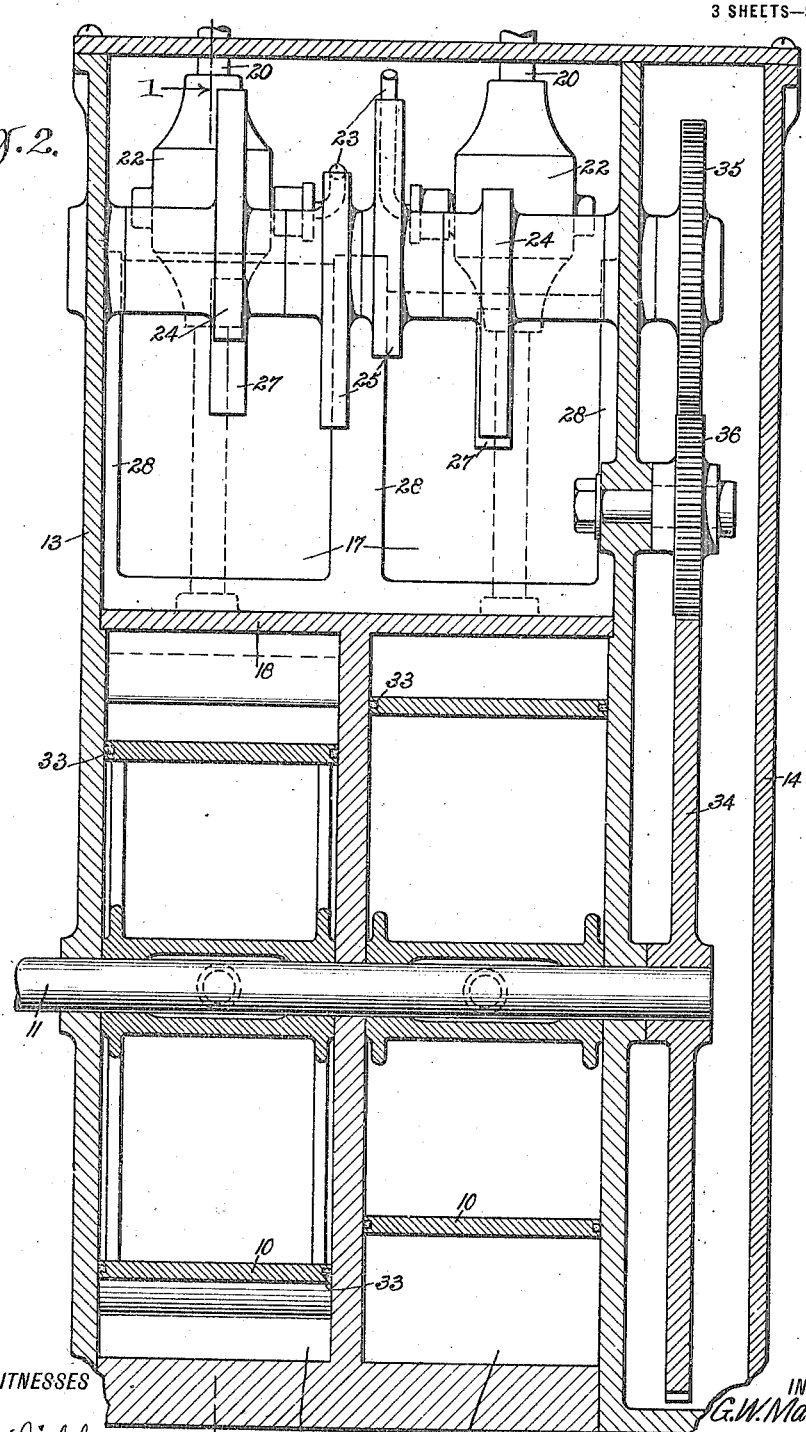

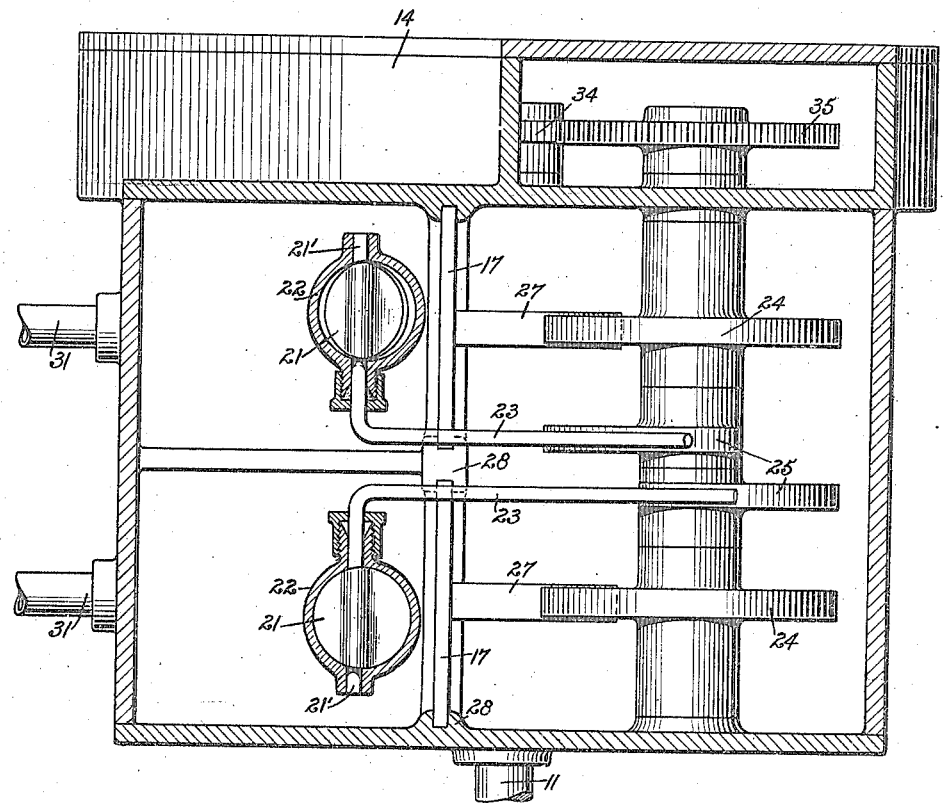

GEORGE WILLIAM MacKINNON, OF BOSTON, MASSACHUSETTS.

ROTARY ENGINE.

1,248,518.         Specification of Letters Patent.         Patented Dec. 4, 1917.

Application filed March 1, 1917. Serial No. 151,708.

*To all whom it may concern:*

Be it known that I, GEORGE W. MACKINNON, a citizen of the United States, and resident of Boston, in the county of Suffolk and State of Massachusetts, have invented a new and Improved Rotary Engine, of which the following is a full, clear, and exact description.

This invention relates to prime movers and has particular reference to engines such as steam or internal combustion engines.

Among the objects of the invention is to provide an engine of the rotary piston type adapted to be operated by the force of a power fluid such as steam, provision being made for a novel type or design of abutment coöperating automatically with the extension or crest portion of the piston so as to insure that there would be no material back pressure tending to retard or obstruct the movement of the piston and also insuring that there shall be no leakage between the piston and any of the other parts.

Another object of the invention is to provide in addition to the improved abutment means above referred to, a novel and simple type of inlet valve for motive fluid.

Another object of the invention is to produce an engine of the multiple rotary piston type for the purpose of insuring practically continuous application of power to the main engine shaft.

A still further object of the invention is to provide an engine of a very compact and self contained construction and one in which the feature of vibration is reduced to a minimum.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical transverse section on the line 1—1 of Fig. 2.

Fig. 2 is a vertical longitudinal section on the broken line 2—2 of Fig. 1 and

Fig. 3 is a horizontal section on the line 3—3 of Fig. 1.

Referring now more particularly to the drawings I show an engine of the rotary piston type, the same having two cylinders A and B in each of which is journaled a rotary piston 10. These pistons are secured upon a main shaft 11 journaled longitudinally in or through the casing or frame work in which the cylinders are formed. The matter of the construction of the casing or frame work is of little moment inasmuch as such features may be variously constructed or designed according to the desire of the builder, or the demand of the trade. For convenience, however, I provide these features as including a base 12 upon which the engine may stand or through which it may be secured in place and also I provide an upward extension 13 for housing the valve mechanisms. Furthermore on one side of the frame or casing is provided an extension 14 to house the cam gears and to reduce the danger and noise incident to the operation thereof.

With reference particularly to Fig. 1 I will now describe the construction and operation of the pistons. As already premised each piston is of rotary type and is adapted to be driven continuously around the axis of the shaft 11, the piston sweeping around the curved surface 15 of the cylinder. Each piston comprises a plurality of projections or crests 16 shown in this instance as three in number, the outer surface of the piston between adjacent crests being depressed inwardly toward the axis of the piston and having an ogee contour, with the deeper portion of the curve or depression forward or just in the rear of the advancing crest. Each crest constitutes a movable abutment and the depression following it constitutes a pocket for the motive fluid or the like.

17 indicates an abutment which may be regarded as relatively fixed with respect to rotation of the piston. This abutment, however, is slidable through the wall 18 of the cylinder in a plane arranged at an angle to the direction of movement of the piston crests. The abutment, however, operates in a plane arranged so as to lie beyond the axis of the piston or in a direction from the axis toward the point where the motive fluid is admitted. In other words the plane of the active face of the fixed abutment may be described as being tangent to a cylinder 19 approximately three times the diameter of the engine shaft and concentric therewith, the point or line of tangency being on the active side of the cylinder or that side on which the motive fluid is admitted and exhausted. The purpose for locating the fixed abutment in the manner just described is to insure that the expansive force of the motive fluid shall not be exerted rearwardly or so as to cause or tend to cause any backward action of the piston.

Considering steam as the motive fluid the same may be admitted through the cylinder wall 18 through a pipe 20 arranged close in advance of the fixed abutment 17. Any suitable means may be provided to admit the steam at the desired time to be most effective. The means I believe at this time to be the most suitable for this purpose includes an oscillating valve 21 pivoted for movement around a transverse axis 21' in a valve casing 22 interposed in or connected to the pipe 20. The valve is shown as being substantially circular and adapted to be operated by a lever 23 extending at a right angle to the pivotal axis of the valve. This axis is slightly eccentric to the valve casing 22, the force of steam acting upon the outer surface of the valve serving thereby to tend to hold the valve closed, but the amount of eccentricity being not so great as to materially add to the running action of the engine.

Any suitable means may be provided to time and control the action of the abutment 17 and valve 21 with respect to the position and action of the piston crests. As a practical suggestion for accomplishing these functions I provide for each piston and its inlet valve a pair of cams 24 and 25 fixed coaxially of each other upon a cam shaft 26 journaled in the upward extension 13 of the casing and parallel to the engine shaft 11. The cam 24 bears at its periphery constantly upon a lug or projection 27 extending laterally from the upper end of the abutment 17. It will be noted that the abutment is guided in its reciprocatory movement in parallel guides 28 constituting parts of the engine casing. With the inner end of the abutment 17 bearing constantly upon the ogee portion of the piston between adjacent crests the cam 24 and its coöperating projection 27 are so designed and adjusted as to insure constant coöperation between all of the several parts as indicated and whereby the abutment will be positively moved both in and out, it being forced inwardly by the cam 24 and outwardly by the rear portion of the ogee.

The cam 25 coöperates directly with the valve lever 23 and acts more quickly to accomplish its function or in other words is more abrupt at its active end than is the cam 24. Note again the arrangement of the parts shown in the full lines in Fig. 1. The valve 21 is in its closed position but with the cam 25 just reaching the point when it will become effective to open the valve. The crest 16 next to receive its impulse has just passed beneath the inner end of the fixed abutment and beyond the inlet port. With the movement therefore of the cam 25 through the next succeeding small angle the valve 21 will be opened and the charge of steam will be admitted into the pocket between the now active crest and the fixed abutment. The cam 25 will hold the valve open long enough for the steam to exert its expansive force and then the valve will close promptly by virtue of a comparatively light spring 29 drawing downwardly upon the lever 23, the opposite end of the spring being anchored at 30. The force of the steam will be exerted upon each crest while the same makes practically one sixth of a rotation, taking into account that each piston has three crests and the second piston has its crests staggered with respect to those of the first piston as indicated in dotted lines. In other words the parts are so designed and adjusted that at least one of the crests of the several pistons will be operative to rotate the power shaft 11. After the charge of steam has exerted its force it will be discharged through the exhaust port or pipe 31 extending through the side wall of the cylinder at the most suitable point.

The active edge or point of each crest 16 is packed with any suitable packing means 32 and the sides of the piston are packed at 33 so as to make all parts of the piston practically steam tight with respect to the cylindrical and side walls of the cylinder.

As a suitable means to positively determine the timing of the valve mechanism I provide a pair of gears 34 and 35 secured respectively to the engine shaft 11 and cam shaft 26. These gears, in accordance with the design of the engine shown, have a ratio of 3:1 whereby the cam shaft will be rotated three times to each rotation of the piston shaft or once for every crest of the piston.

36 indicates an idler interposed between the two main gears which serves to bridge the space between them and insure the rotation of both shafts in the same direction. A vent 37 may be formed in or through the cylinder wall 18 just at the rear of the fixed abutment so as to prevent the compression or formation of a cushion of air in that pocket into which the fixed abutment is about to move.

I claim:

1. In a rotary engine, the combination of a cylinder, a piston journaled for continuous rotation therein, said piston comprising a plurality of crests moving around in contact with the cylindrical surface of the cylinder, packing means making tight joints between the piston and the walls of the cylinder, the piston being provided with an ogee surface between each two adjacent crests and constituting the inner wall of a pressure fluid cavity, an abutment member reciprocating in and out through the cylindrical wall of the cylinder and bearing constantly at its inner end upon the periphery of the piston, said abutment acting in a plane tangent to an imaginary cylinder concentric with the axis of the piston and on the active side of the cylinder, said abutment being movable outwardly by the piston, means acting on the abutment to force it inwardly and hold it in contact with the piston, means to admit motive fluid into the cylinder in front of the abutment so as to act upon each crest just after it has passed the abutment, and means to control the admission of motive fluid in accordance with the position of the piston.

2. In a rotary engine, the combination of a cylinder, a rotary piston journaled therein and including a projection constituting a movable abutment against which the motive fluid is adapted to act, a relatively fixed abutment against which said motive fluid reacts, the latter mentioned abutment, however, being adapted to reciprocate in and out through the curved wall of the cylinder in a plane at an angle to the direction of movement of the piston projection, said cylinder having inlet and outlet ports, a normally closed valve for the admission of motive fluid, a cam shaft, a pair of cams secured upon the cam shaft, and means actuated by the respective cams to cause the inward movement of the relatively fixed abutment and the opening of the valve at precise predetermined times according to the position of the piston projection.

3. In an engine of the character set forth, the combination of a cylinder, a piston movable therein, said cylinder having inlet and exhaust ports, a valve coöperating with the inlet port, said valve being journaled for oscillation around an eccentric axis providing for a greater outside pressure thereon from the motive fluid upon one side than the other tending to hold the valve closed, and means actuated from the piston to cause the opening of the valve against said outside pressure at a predetermined time.

GEORGE WILLIAM MacKINNON.

Copies of this patent may be obtained for five cents each, by addressing the "Commissioner of Patents, Washington, D. C."